US012054366B2

(12) United States Patent
Smith, Jr.

(10) Patent No.: US 12,054,366 B2
(45) Date of Patent: Aug. 6, 2024

(54) COLLECTION DEVICE WITH RELEASABLE BOTTOM

(71) Applicant: William Penfield Smith, Jr., Adairsville, GA (US)

(72) Inventor: William Penfield Smith, Jr., Adairsville, GA (US)

( * ) Notice: Subject to any disclaimer, the term of this patent is extended or adjusted under 35 U.S.C. 154(b) by 828 days.

(21) Appl. No.: 17/135,692

(22) Filed: Dec. 28, 2020

(65) Prior Publication Data

US 2021/0198086 A1 Jul. 1, 2021

Related U.S. Application Data

(60) Provisional application No. 62/955,483, filed on Dec. 31, 2019.

(51) Int. Cl.

*B66C 3/16* (2006.01)
*B66C 13/14* (2006.01)
*B66C 13/20* (2006.01)

(52) U.S. Cl.

CPC ................ *B66C 3/16* (2013.01); *B66C 13/14* (2013.01); *B66C 13/20* (2013.01)

(58) Field of Classification Search

CPC . B66C 3/16; B66C 13/14; B66C 13/20; B65F 3/0203; B65F 1/125

See application file for complete search history.

(56) References Cited

U.S. PATENT DOCUMENTS 3,270,902 A 9/1966 Breault
3,407,899 A 10/1968 Delafrange
4,295,431 A * 10/1981 Stavlo ................... F17C 13/084 294/67.1
4,363,588 A 12/1982 Stickney
5,222,619 A 6/1993 Gregory
5,507,237 A * 4/1996 Barrow ..................... B66C 1/16 108/55.3
5,609,111 A * 3/1997 Hasegawa ................ B65D 7/24 206/600
6,446,919 B1 9/2002 Tsui
7,806,287 B2 10/2010 Rouns
7,997,213 B1 * 8/2011 Gauthier .............. B65D 88/022 294/67.1
8,079,791 B2 * 12/2011 Ness .................... B65D 88/123 410/31
9,938,060 B2 4/2018 Jian et al.

(Continued)

FOREIGN PATENT DOCUMENTS

DE 3040479 5/1981
ES 0790194 A1 * 8/1997

OTHER PUBLICATIONS wayfair.com; Article entitled: "Tan/Chocolate brown Store-It-Out Max 57" W x 32" D Plastic Horizontal Garbage Shed", located at <https://www.wayfair.com/storage-organization/pdp/keter-store-it-out-max-5-ft-w-x-3-ft-d-plastic-horizontal-garbage-shed-ktr1219.html>, published Oct. 2019, 8 pgs.

*Primary Examiner* — Stephen A Vu

(74) *Attorney, Agent, or Firm* — Taylor English Duma LLP

(57) ABSTRACT

A collection device can include an enclosure defining a top opening and a bottom opening; a latch coupled to the enclosure and configured to selectively secure a base to the enclosure proximate to the bottom opening; and an actuator coupled to the latch, the actuator controlled remotely and configured to open the latch and thereby release the base.

26 Claims, 12 Drawing Sheets

(56) References Cited

U.S. PATENT DOCUMENTS

| | | | |
|---|---|---|---|
| 10,384,867 | B2 | 8/2019 | Jian |
| 2005/0150892 | A1 | 7/2005 | Miller |
| 2019/0161997 | A1 | 5/2019 | Dworkin |

* cited by examiner

COLLECTION DEVICE WITH RELEASABLE BOTTOM

REFERENCE TO RELATED APPLICATIONS

This application claims the benefit of U.S. Provisional Application No. 62/955,483, filed Dec. 31, 2019, which is hereby specifically incorporated by reference herein in its entirety.

TECHNICAL FIELD

Field of Use

This disclosure relates to collection devices for use in collecting, disposing, and otherwise handling materials in bulk. More specifically, this disclosure relates to collection devices with releasable bottoms for dumping their contents.

Related Art

Myriad solutions exist for collecting trash and other materials before transport elsewhere for further disposal, recycling, or reuse. Smaller containers able to be picked up by one person are plentiful but are not practical for large amounts of material or for heavy materials and especially construction debris, which often must be segregated from other trash. Larger containers able to be picked up by a forklift or truck with large "forks" configured to slide into slots defined in the containers are also plentiful in various sizes and configurations but are not practical where access by a forklift or disposal truck is difficult (e.g., on non-level and/or unpaved surfaces of a construction site) or where space for the container is limited. Materials collected in medium-sized containers able to hold significant weight must sometimes be transferred manually, often by hand, to another container. Even where such a container can theoretically be lifted and moved by machine, there is typically no good provision for also releasing or dumping the material from the container.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a collection device comprising: an enclosure defining a top opening and a bottom opening; a latch coupled to the enclosure and configured to selectively secure a base to the enclosure proximate to the bottom opening; and an actuator coupled to the latch, the actuator controlled remotely and configured to open the latch and thereby release the base.

In a further aspect, disclosed is a vehicle comprising: a chassis; a receptacle coupled to the chassis; a collection device coupled to one of the chassis and the receptacle, the collection device comprising: an enclosure; a base coupled to a first portion of the enclosure; a latch selectively securing the base to a second portion of the enclosure; and an actuator coupled to the latch; the actuator configured to operate the latch and thereby selectively release and secure the base; and a controller coupled to one of the chassis, the receptacle, and the collection device, the controller configured to control the actuator.

In yet another aspect, disclosed is a method of using a collection system, the method comprising: lifting a collection device of the system, an enclosure of the collection device of the system enclosing a material deposited therein by a user of the collection system; activating an actuator of the collection device with a controller to disengage a latch of the collection device from a base of the collection device; and releasing the base of the collection device from at least a portion of the enclosure to allow the material to exit a bottom opening defined by the collection device.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

Figure 1:
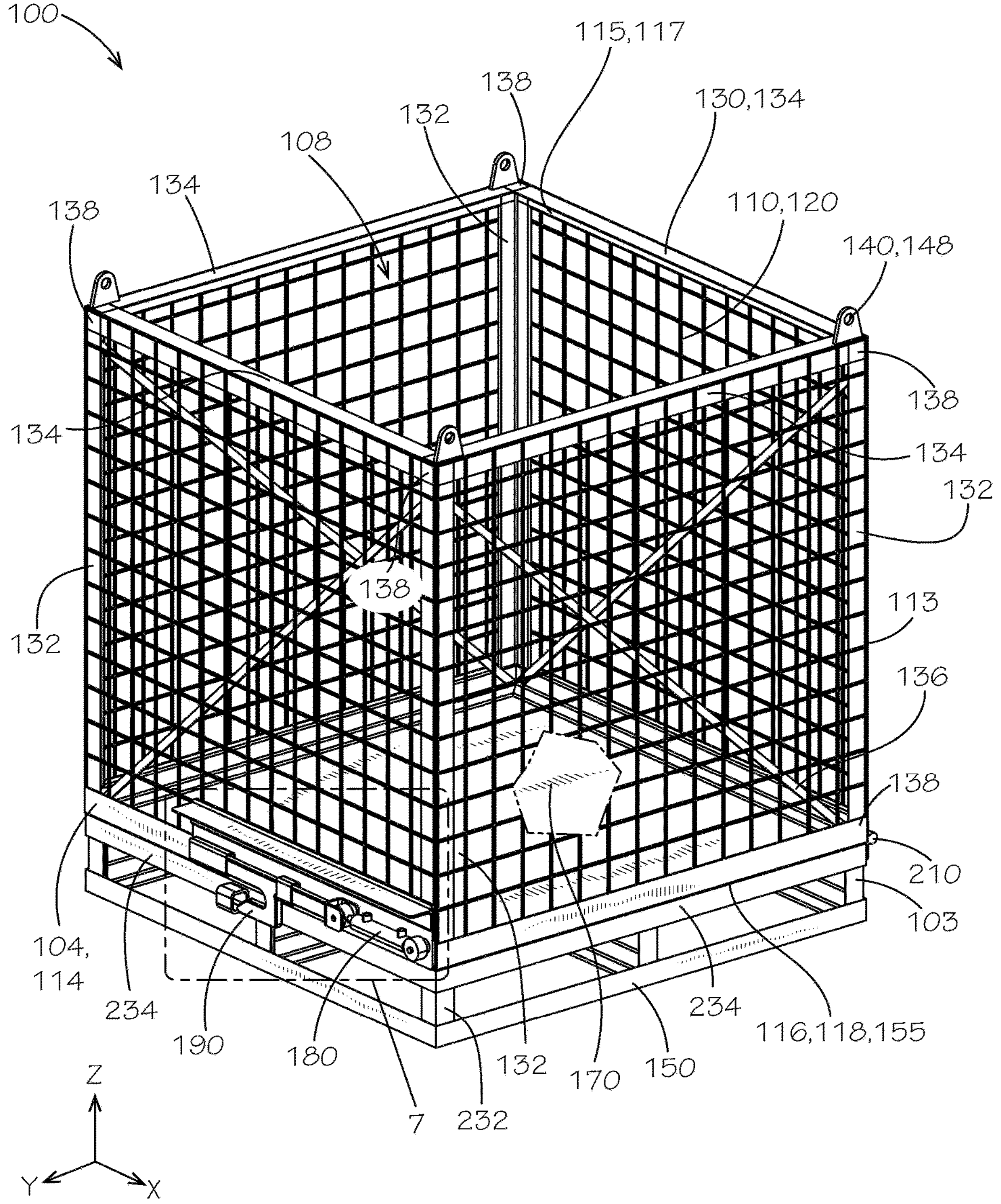
FIG. 1 is a front perspective view of a collection device with a releasable bottom in accordance with one aspect of the current disclosure showing a latch and an actuator of the collection device.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the collection device nearest to an actuator of the device or a front of a vehicle comprising the device; "rear" is that end of the collection device or the vehicle that is opposite or distal the front; "left" is that which is to the left of or facing left from a person standing in a center of the device or sitting in a seat of the vehicle and facing towards the front; and "right" is that which is to the right of or facing right from that same person while facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

The collection device and other aspects of the structures and methods described herein can alternately be described on the basis of a coordinate axis of X-Y-Z directions shown in FIG. 1. An X-axis direction can be referred to as a left-right direction (referencing the aforementioned left and right directions) and generally lies in a horizontal plane. A Y-axis direction is orthogonal to the X-axis direction and also lies in the horizontal plane. A Z-axis direction can be referred to as an up-down or vertical direction and is orthogonal to the X-axis direction and to the Y-axis direction and typically coincides with a height direction of the collection device.

In one aspect, a collection device and associated methods, systems, devices, and various apparatuses are disclosed herein. In one aspect, the collection device can comprise an enclosure and a base.

FIG. 1 is a front perspective view of a collection device 100 with a releasable bottom. The collection device 100 can comprise an enclosure 110, and the releasable bottom can be a base 150. The collection device 100 can comprise a first portion 103 and a second portion 104, which can be distal from the first portion 103. The enclosure 110 can comprise an enclosure barrier 120, which can generally define an enclosure cavity 108. The enclosure barrier 120 can be a vertical barrier or a barrier angled with respect to the vertical. In some aspects, the enclosure 110 can comprise a frame 130, which can provide strength and rigidity to the enclosure 110 and prevent racking or collapse of same, including under conditions requiring reinforcement of the enclosure 110. In some aspects, the base 150 need not comprise the frame 130 but can comprise the enclosure barrier 120 without the frame 130. The enclosure 110 can comprise one or more lifting lugs 140, each of which can define a lifting opening 148. In some aspects, as shown, the lifting lugs 140 and the lifting openings 148 can be part of the frame 130. In other aspects, the lifting lugs 140 can be formed from another portion of the enclosure 110 such as, for example and without limitation, the enclosure barrier 120.

When stood upright as shown, the enclosure 110 can define a top end 115 defining a top opening 117 and a bottom end 116 defining a bottom opening 118. In some aspects, either or both of the top opening 117 and the bottom opening 118 can be sized to allow a maximum amount of material into and out of the collection device 100 during use, which can be accomplished by configuring a horizontal cross-sectional area of the collection device 100 (i.e., a cross-sectional area in the X-Y plane) being substantially equal to or greater than a cross-section area in the X-Y plane of the collection device at any position between the top opening 117 and the bottom opening 118. By "being substantially equal," it is not intended that the size of the frame 130, if present, necessarily be considered but it can be. In other aspects, either or both of the top opening 117 and the bottom opening 118 can be restricted in various ways and for various purposes. For example, at the respective top opening 117 and the bottom opening 118 or from a vertical position offset from the respective top opening 117 and the bottom opening 118 a cross-sectional area in the X-Y plane can be restricted to funnel or otherwise direct, meter, or evenly distribute materials coming into or out of the collection device 100.

The collection device 100 can be configured to collect and later release any materials as desired by a user of the collection device 100 including, for example and without limitation, trash, recyclable materials, construction debris, manufacturing or other scrap, and any other solids or liquids. In some aspects, such as when the collection device 100 collects liquids, an interface between the enclosure 110 and the base 150 can comprise a seal to prevent or discourage passage of the liquids through the interface and from the collection device 100.

The frame 130 can comprise one or more members 132, 134, 136. The frame 130 can more specifically comprise one or more vertical members 132, one or more horizontal members 134, and one or more diagonal members 136. As shown, four of the vertical members 132 can extend from the top end 115 to the bottom end 116 of the enclosure 110. Also as shown, four horizontal members 134 can extend around the top end 115 of the enclosure 110 and at least in part define the top opening 117. Likewise, four horizontal members 134 can extend around the bottom end 116 of the enclosure 110 and at least in part define the bottom opening 118.

The horizontal members 134 can be joined to the vertical members 132 at joints 138, at which also one or more of the diagonal members 136 can also be joined. As shown, one of the diagonal members 136 can extend from one of the joints 138 proximate to the bottom end 116 to one of the joints 138 proximate to the top end 115 at an angle from the vertical across the frame 130. In other aspects, the members 132, 134, 136 can form or define additional instances of the joints 138 not shown.

Any of the members 132, 134, 136 can be joined to each other using a fastener or a fastening structure. In some aspects, as shown, any of the members 132, 134, 136 can be welded or can comprise weldments at the joints 138. In some aspects, any of the members 132, 134, 136 can be joined with mechanical fasteners such as, for example and without limitation, bolts, screws, or rivets at the joints 138. In some aspects, any of the members 132, 134, 136 can interlock without any separate fastener or fastening structure. In some aspects, a plurality of horizontal members 134 or a plurality of vertical members 132 and horizontal members 134 can be formed monolithically from a single structural members. For example, instead of separate cut pieces of the members 132, 134, 136 being joined at the joints 138, a single member can be bent to form a second, third, or fourth member 132, 134, 136 extending at an angle with respect to the first, second, or third member 132, 134, 136, respectively.

As shown, in some aspects, any of the members 132, 134, 136 can define a cross-sectional shape configured to resist bending about a longitudinal axis such as, for example and without limitation, an L-shape defined or formed by angle iron stock, a box shape formed by square tube stock, a round shape formed by round tube stock, or an I-shape formed by I-beam stock. In some aspects, the members 132, 134, 136 can be hollow to maximize a strength to weight ratio. In other aspects, the members 132, 134, 136 can be solid. In some aspects, any of the members 132, 134, 136 can define a cross-sectional shape configured to resist tensile or compression forces such as a rod. As shown, each of the members 132, 134, 136 can be formed from the aforementioned angle iron stock, which can effectively resist bending with minimal weight and cost. As shown, the lifting lugs 140 can be secured to the members 132, 134, 136 proximate to the joints 138 and four corners of the top end 115 of the top end 115 using any of the fastening method used to join the members 132, 134, 136 to each other such as, for example and without limitation, weldments, mechanical fasteners, or an interlocking structure not requiring separate fasteners.

As shown, in some aspects, the enclosure barrier 120 can be supported by the frame 130. In some aspects, the enclosure barrier 120 can be self-supporting. In some aspects, as shown, the enclosure barrier 120 can define a plurality of regularly spaced openings and thereby be configured to allow passage of air and water but not any solid materials larger than any openings in the enclosure barrier. More specifically, the enclosure barrier can comprise a screen mesh. In other aspects, the enclosure barrier 120 can be substantially closed (i.e., extending continuously across its surface without openings) except for any drain openings (if drainage is desired) towards the bottom end 116 of the enclosure 110. The enclosure barrier 120 can be secured to the frame 130—on an inwardly facing surface or, as shown, on an outwardly facing surface of the frame 130—and to itself at ends of the enclosure barrier 120 with welds or with another fastener or fastening structure or be interlocking without a separate fastening structure. The enclosure barrier 120 can be defined by a single piece of material or a plurality of pieces, each of which can be separately secured to the enclosure 110.

The base 150 of the collection device 100 can comprise a base barrier 170, which can extend horizontally across a top end 155 of the base 150. In some aspects, as shown, the base barrier can be a plate or a panel, which can be formed from a material such as, for example and without limitation, metal, plastic, wood, or a product derived therefrom. In some aspects, the base barrier 170 can be solid. In some cases, the base barrier 170 can define one or more openings. The base 150 can be permanently or temporarily coupled to the enclosure 110 or a portion thereof by any one of several structures. As shown, the base 150 can be coupled to a first portion 113 of the enclosure 110 with a hinge 210.

The collection device 100 can further comprise a latch 190, which can be coupled to the enclosure 110 and can selectively secure the base 150 to the enclosure 110 and more specifically a second portion 114 thereof. Any of the first portion 113 and the second portion 114 can be or comprise an edge. The second portion 114 can be positioned distal from the first portion 113. As shown, an actuator 180 can be coupled to the latch 190. In some aspects, the actuator 180 can be controlled remotely (i.e., away from the actuator 180 itself and, in some aspects, away from the collection device 100, e.g., for safety in either case to distance a user controlling the collection device 100 from the collection device 100 during its use) and can be configured to open the latch 190 and thereby release the base 150 from the enclosure 110 at the second portion 114 of the enclosure 110. The actuator 180 can be a hydraulic cylinder such as, for example and without limitation, a hydraulic cylinder defining a 4-inch strike and a 1.5-inch bore and an operating pressure of 2,500 psi; however, the actuator type, size, and pressure rating can be adjusted as appropriate such as when friction increases or decreases as the result of using different materials for components of the latch 190. As will be described, the actuator 180 can be configured to be operated by a controller to facilitate movement of the collection device 100 between open and closed positions. In some aspects, the actuator 180 can initially or upon manufacture of the collection device 100 be outfitted with quick connect fittings for ease of making connections to remote controls and a hydraulic fluid supply. In some aspects, the actuator 180 can be any controllable cylinder controlled, e.g., by a fluid; or a motor such as, for example and without limitation, a linear motor.

Figure 2:
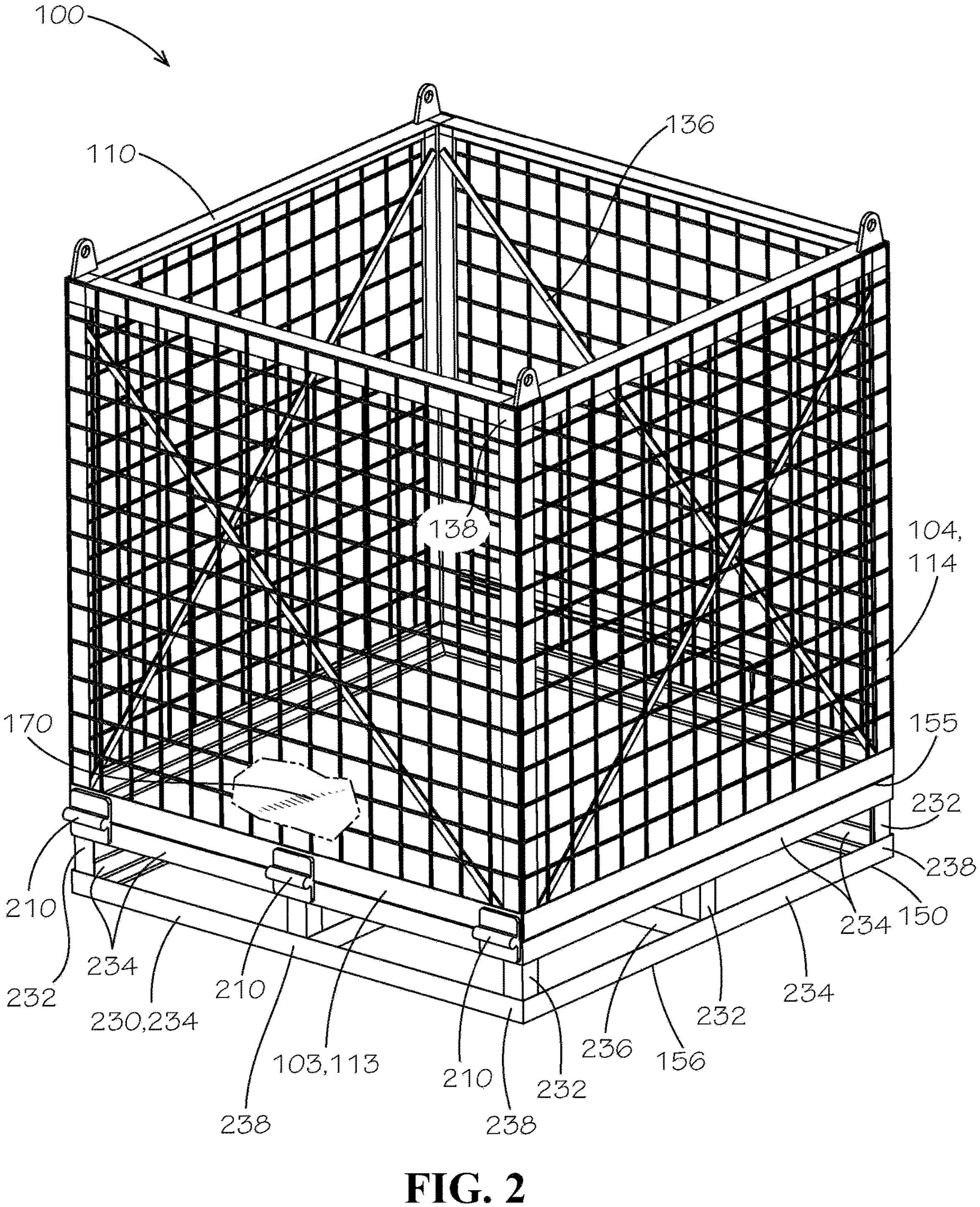
FIG. 2 is a rear perspective view of the collection device of FIG. 1 showing a hinge of the collection device.

FIG. 2 is a rear perspective view of the collection device 100, i.e., from a side of the collection device 100 facing more directly the first portion 103 of the collection device and the first portion 113 of the enclosure 110, showing a plurality of the hinges 210 connecting or securing or coupling the base 150 to the enclosure 110. Each of the hinges 210 can be secured to the base 150 and the enclosure 110 with one or more fasteners or by welding or by another fastening structure. In some aspects, the hinges 210 can permanently secure the base 150 to the enclosure 110. In other aspects, a second portion or half and a first portion or half of the hinge 210 can disengage or separate from each other at a certain open angle or by removal of a hinge pin 810 (shown in FIG. 8), which can join the portions or halves of the hinge 210. Any one of the hinges 210 can comprise a stop or limiter configured to stop opening of the base 150 or base halves 150*a,b* (shown in FIG. 11) pasta maximum desired angle (to, for example and in some aspects, facilitate return of the base to the closed position by simply resting the container on the ground). For example and without limitation, a stop on at least one of the hinges 210 can prevent an open angle 157 (shown in FIG. 15) of the base 150 relative to the bottom end 116 of the enclosure 110 past M degrees (shown in FIG. 15), where M can be an acute angle such as 60, 65, 70, 75, 80, or 85 degrees.

In some aspects, the base 150 can comprise a frame 230, which can comprise one or more members 232, 234, 236. The frame 230 can provide strength and rigidity to the base 150 and prevent racking or collapse of same, including under conditions requiring reinforcement of the base 150. In some aspects, the base 150 need not comprise the frame 230 but can comprise the base barrier 170 without the frame 230. The frame 230 can more specifically comprise one or more vertical members 232, one or more horizontal members 234, and one or more cross members 236. As shown, at least four of the vertical members 232 (at least one instance of the vertical member 232 shown in FIG. 1) can extend from corners of the top end 155 to a bottom end 156 of the base 150. Also as shown, at least four horizontal members 234 can extend around the top end 155 of the base 150 and at least in part define a top opening (not shown) covered by the base barrier 170. Likewise, at least four horizontal members 234 (at least two instances of the horizontal members 234 shown in FIG. 1) can extend around the bottom end 156 of the base 150 and can at least in part define a bottom opening 158 (shown in FIG. 3).

The horizontal members 234 can be joined to the vertical members 232 at joints 238 (representatively shown in FIG. 3), at which also one or more of the cross members 236 can also be joined. In other aspects, the members 232, 234, 236 can form or define additional instances of the joints 238 not shown.

Any of the members 232, 234, 236 can be joined to each other using a fastener or a fastening structure. In some aspects, as shown, any of the members 232, 234, 236 can be welded or can comprise weldments at the joints 238. In some aspects, any of the members 232, 234, 236 can be joined with mechanical fasteners such as, for example and without limitation, bolts, screws, or rivets at the joints 238. In some aspects, any of the members 232, 234, 236 can interlock without any separate fastener or fastening structure. In some aspects, a plurality of horizontal members 234 or a plurality of vertical members 232 and horizontal members 234 can be formed monolithically from a single structural members. For example, instead of separate cut pieces of the members 232, 234, 236 being joined at the joints 238, a single member can be bent to form a second, third, or fourth member 232, 234, 236 extending at an angle with respect to the first, second, or third member 232, 234, 236, respectively.

The base 150 and specifically the frame 230 can comprise one or more diagonal members (not shown), including those similar in structure to the diagonal members 136 of the enclosure 110, and the enclosure 110 can comprise one or more cross members (not shown), including those similar in structure to the cross members 236 of the base 150.

Figure 3:
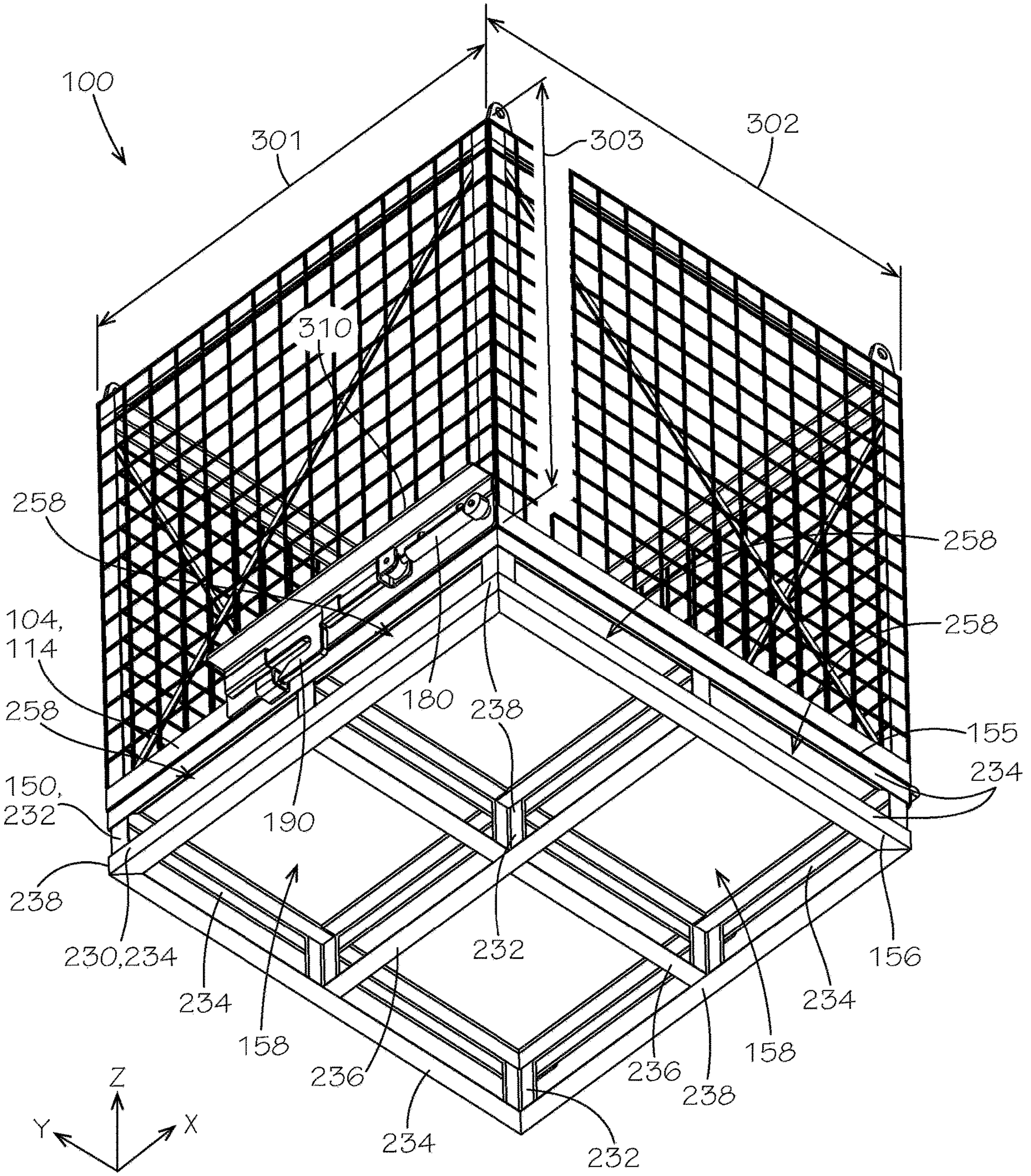
FIG. 3 is a bottom perspective view of the collection device of FIG. 1.

FIG. 3 is a bottom perspective view of the collection device 100 showing the frame 230 and more specifically the members 232, 234, 236. As mentioned above, the frame 230 can at least in part define the bottom opening 158, which can be divided into a plurality of smaller openings by the cross members 236. The base 150 and more specifically the frame 230 and one or more portions thereof such as the members 232, 234, 236 can more specifically define vertical or side openings 258 as shown. While the bottom openings 158 and the side openings 258 can yield benefits such as, for example and without limitation, reducing a component weight of the base 150 and an overall weight of the collection device 100 and improving manufacturability by providing access to the joints, the openings 158, 258 can also facilitate use of a forklift or a pallet jack where such equipment is available to transport the collection device 100 and the environment itself is suitable.

Either or both of the cylinder 180 and the latch 190 can be shielded from one or more directions by a guard 310. As shown, both of the cylinder 180 and the latch 190 can be shielded from above by the guard 310. The guard can protect either or both of the cylinder 180 and the latch 190 from otherwise unnecessary influence such as, for example and without limitation, moisture, other environmental conditions, or impact by other objects including those placed inside the collection device.

The enclosure 110 can define external dimensions such as a length 301 in the X-axis direction, a width or depth 302 in the Y-axis direction, and a height 303 in the Z-axis direction.

In some aspects, the length 301 and the depth 302 of the enclosure 110 will match a corresponding length and depth of the base 150. In some aspects, the length 301 and the depth 302 of the enclosure 110 need not match the corresponding length and depth of the base 150 and can instead be smaller or larger, in which case the latch or latches 190 can be modified to accommodate such smaller or larger dimensions.

Figure 4:
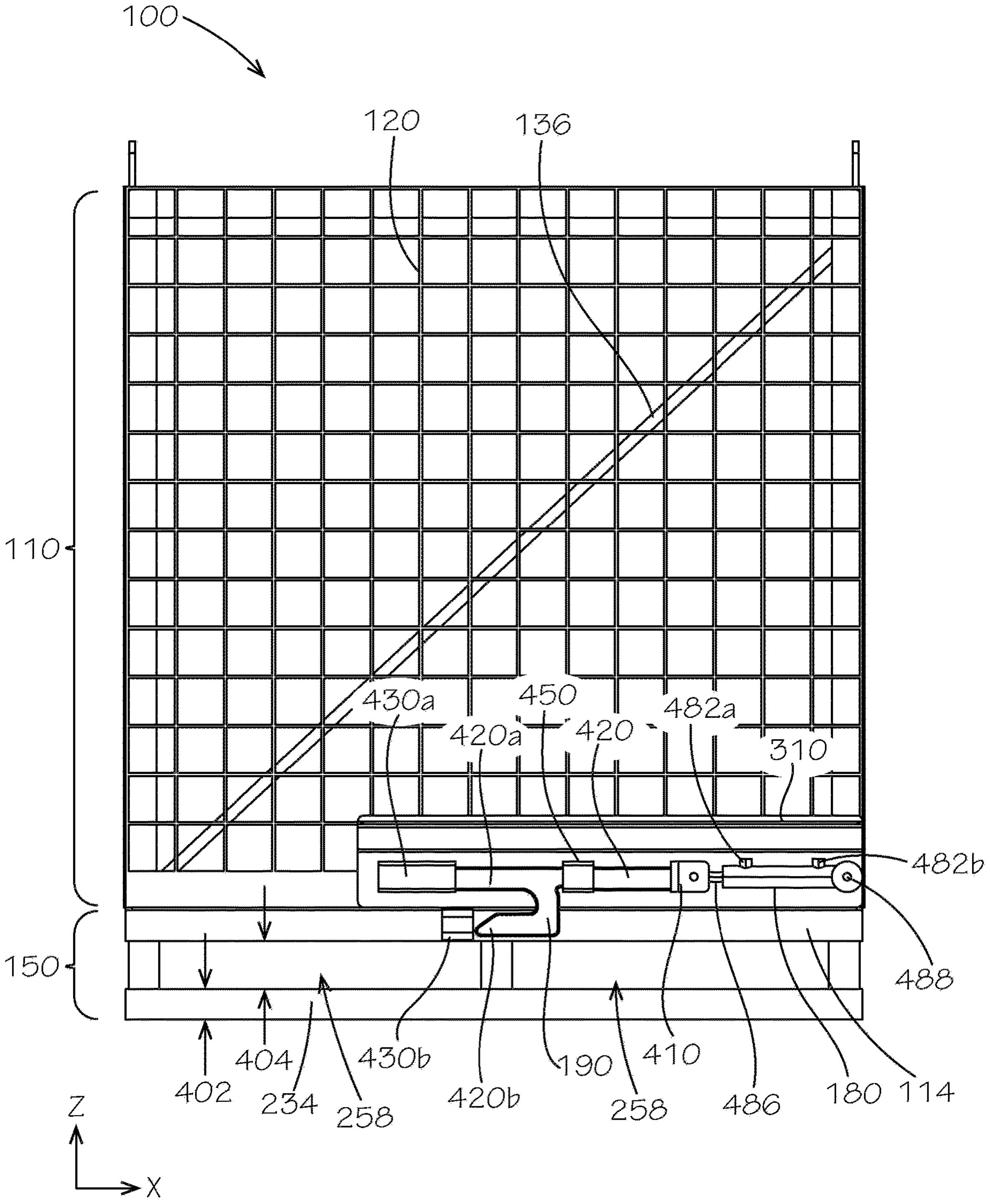
FIG. 4 is a front view of the collection device of FIG. 1 comprising a latch defining two prongs.

FIG. 4 is a front view of the collection device 100. In some aspects, a height 402 in the Z-axis direction of the horizontal members 234 and a height 404 in the Z-axis direction of the side openings 258 can be adjusted to receive forks of the aforementioned forklift or forks and surrounding structure of the aforementioned pallet jack. In the case of the pallet jack, wheels of the pallet jack can extend to the ground surface or floor through the bottom opening(s) 158 (shown in FIG. 3).

The latch 190 can comprise a joint 410, which can join the latch 190 to the actuator 180. In some aspects, a first portion 420*a* of a bolt 420 of the latch 190 can extend from the joint 410 towards an upper strike 430*a*. Likewise, a second portion 420*b* of the bolt 420 can extend from the joint 410 and/or, as shown, from the first portion 420*a* towards a lower strike 430*b*. As shown, the bolt 420 can therefore define a forked shape with two prongs defined by the first portion 420*a* and the second portion 420*b*. A tip of either or both of the first portion 420*a* or the second portion 420*b* can be angled with respect to a direction of travel of the bolt 420 to facilitate insertion of the bolt 420 into the upper strike 430*a* or the lower strike 430*b*. The upper strike 430*a* can be secured to the enclosure 110, while the lower strike 430*b* can be secured to the base 150. To support the bolt 420 between the actuator 180 and the strikes 430*a,b*, the bolt 420 can extend though and a movement of the bolt in the Z-axis direction restricted by a guide 450. The bolt 420 can thereby engage a portion of the base 150.

The cylinder 180 can define a first input 482*a* and a second input 482*b*, which can be in fluid communication with a hydraulic (fluid) or pneumatic (air) input and can selectively control movement of a piston and accompanying rod 486 of the cylinder 180 in an X-axis direction or in any other direction in which a longitudinal axis of the cylinder 180 can be oriented. The cylinder can be secured to the enclosure 110 with a mounting fastener 488.

In some aspects, as shown, the second portion 114 of the enclosure 110 proximate to which the cylinder 180 is secured can be distal from and also opposite from the first portion 113 (shown in FIG. 2) of the enclosure 110. More specifically, more than one cylinder 180 can be secured to the second portion 114 of the enclosure 110. In other aspects, the second portion 114 of the enclosure 110 proximate to which the one or more cylinders 180 is (or are) secured can be a side of the enclosure 110 and of the collection device 100 that is adjacent to the first portion 113 of the enclosure 110; for example and without limitation, one cylinder 180 can be secured to opposite sides of the enclosure 110, each of which can be adjacent to the first portion 113 of the enclosure 110.

Figure 5:
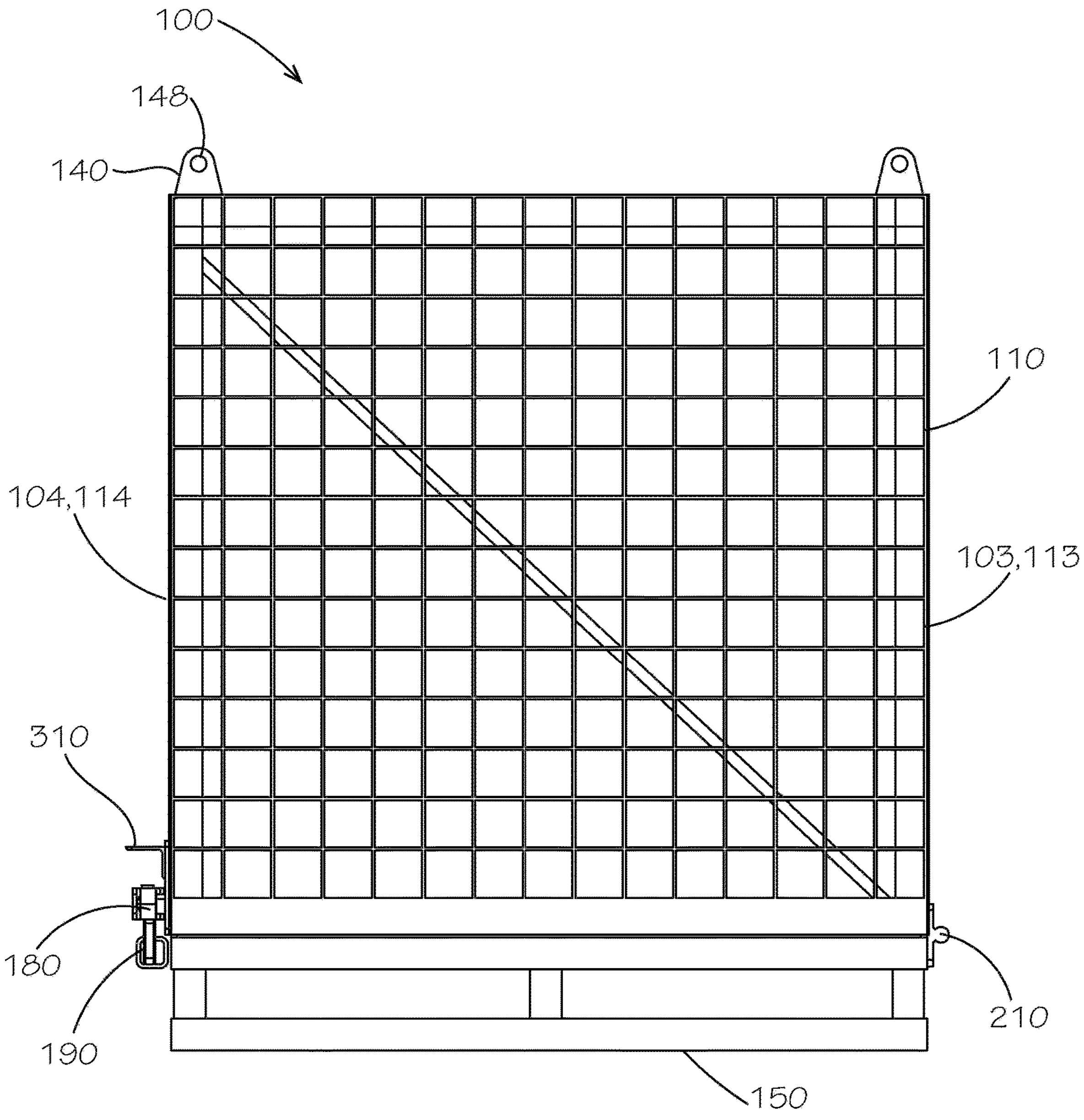
FIG. 5 is a first side view of the collection device of FIG. 1 from a side of the collection device proximate to the actuator of FIG. 1.
Figure 6:
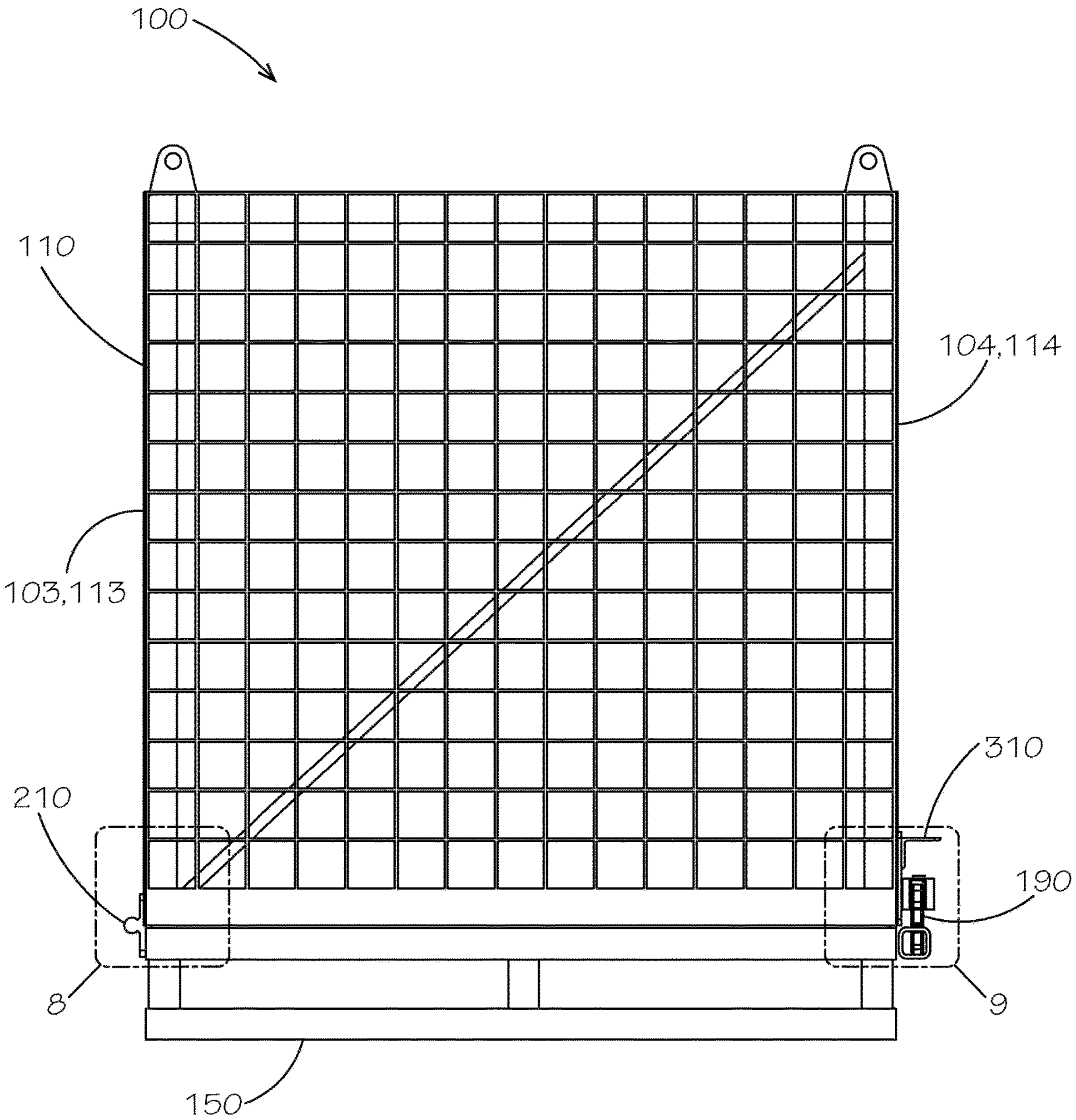
FIG. 6 is a second side view of the collection device of FIG. 1 from a side of the collection device distal from the actuator of FIG. 1.

FIG. 5 is a first side view of the collection device 100 from a side of the collection device 100 proximate to the actuator 180 and between the first portions 103, 113 and the second portions 104, 114, and FIG. 6 is a second side view of the collection device 100 from a side of the collection device 100 distal from the actuator 180 (shown in FIG. 5) and between the first portions 103, 113 and the second portions 104, 114. In some aspects, as shown in FIGS. 1-6, an outer surface or envelope of the enclosure 110 can be aligned with an outer surface or envelope of the base 150 in each of the X,Y,Z-axis directions, each outer surface or envelope also defining an outer surface or edge of the collection device 100. In other aspects, an outer surface or envelope of the enclosure 110 can be offset from an outer surface or envelope of the base 150 in each of the X,Y,Z-axis directions. The outer surface or envelope of the enclosure 110 can more specifically be offset inward or outward relative to a vertical centerline of the enclosure 110.

Figure 7:
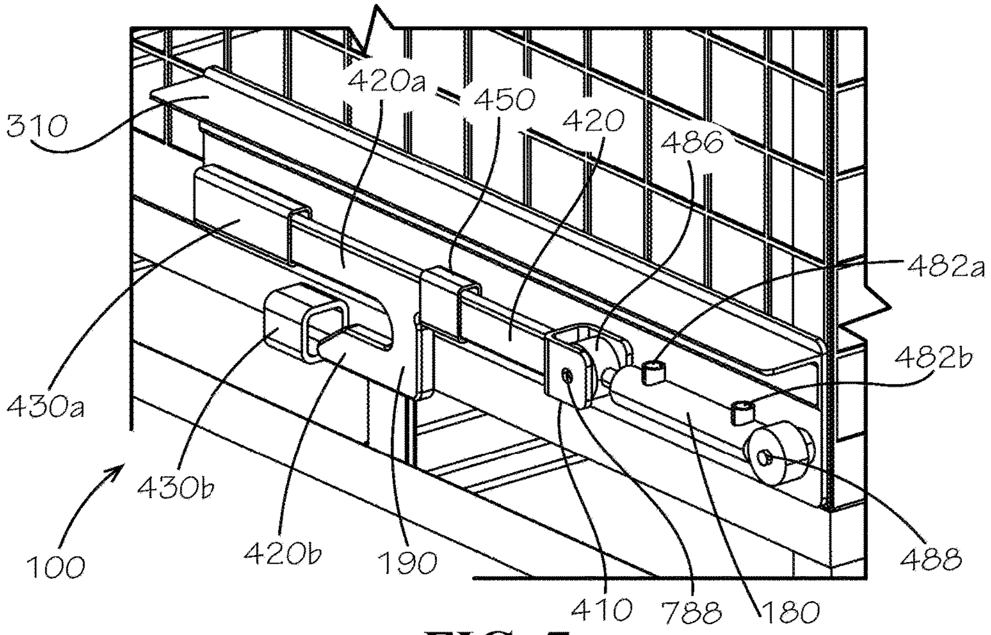
FIG. 7 is a detail perspective view of the collection device of FIG. 1 taken from detail 7 of FIG. 1.

FIG. 7 is a detail perspective view of the collection device 100. In some aspects, as shown, each of the strikes 430*a,b* and the guide 450 can be formed from a section of square or rectangular tube. In other aspects, any of the strikes 430*a,b* and the guide 450 can define any open or closed shape configured to receive the bolt 420 upon engagement of the latch 190 therewith. The joint 410 can be secured to the cylinder 180 and more specifically the rod 486 with a fastener 788.

Figure 8:
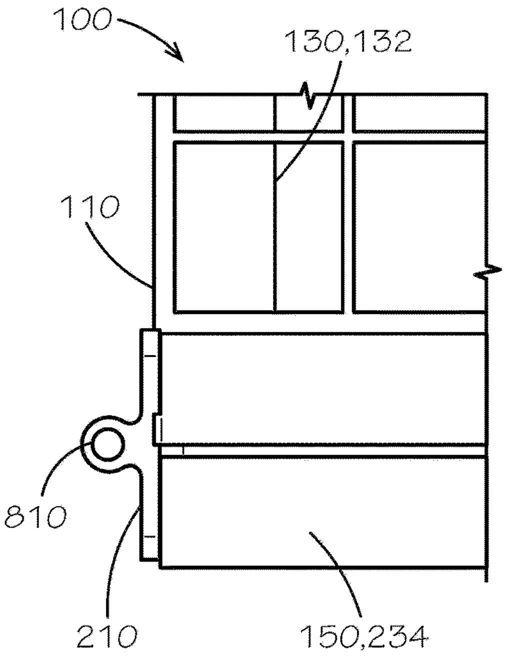
FIG. 8 is a detail side view of the collection device of FIG. 1 taken from detail 8 of FIG. 6.
Figure 9:
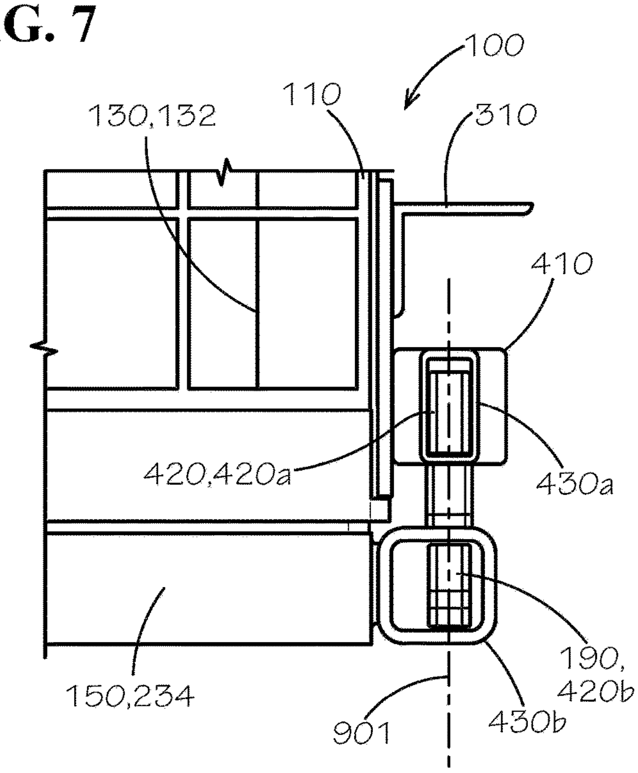
FIG. 9 is a detail side view of the collection device of FIG. 1 taken from detail 9 of FIG. 6.

FIGS. 8 and 9 are detail side views of the collection device 100 showing the hinge 210 and the latch 190, respectively. The latch 190 and specifically the separate prongs or portions 420*a,b* of the bolt 420 can be aligned with each other vertically in a vertical plane 901, which can align with or fall within an interior cavity of the strikes 430*a,b* with which the latch 190 can engage. In some aspects, the strikes 430*a,b* or portions thereof can be aligned with each other, including along the vertical plane 901 as shown.

Figure 10:
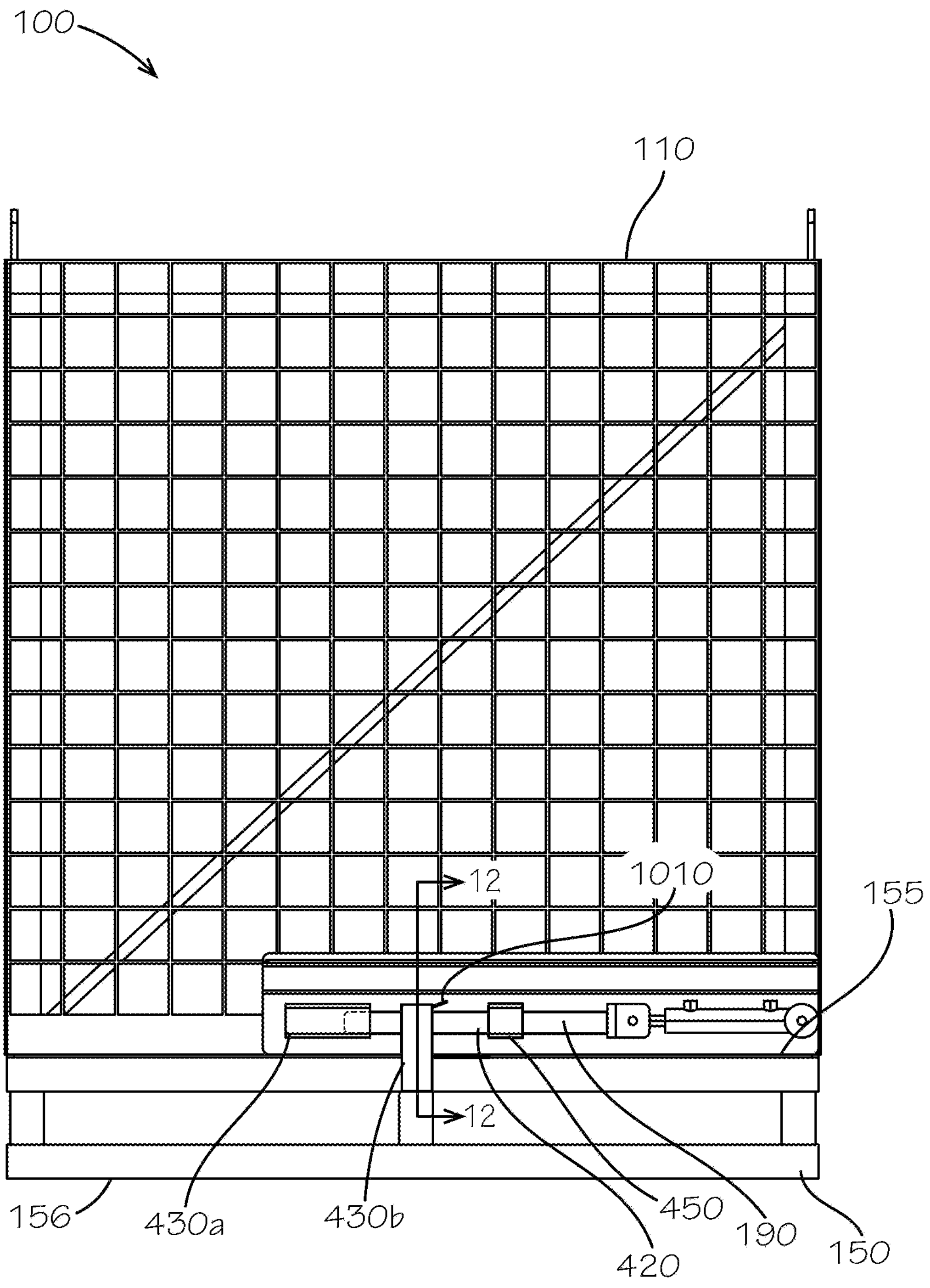
FIG. 10 is a front view of the collection device of FIG. 1 comprising a latch defining a single prong in accordance with another aspect of the current disclosure.
Figure 11:
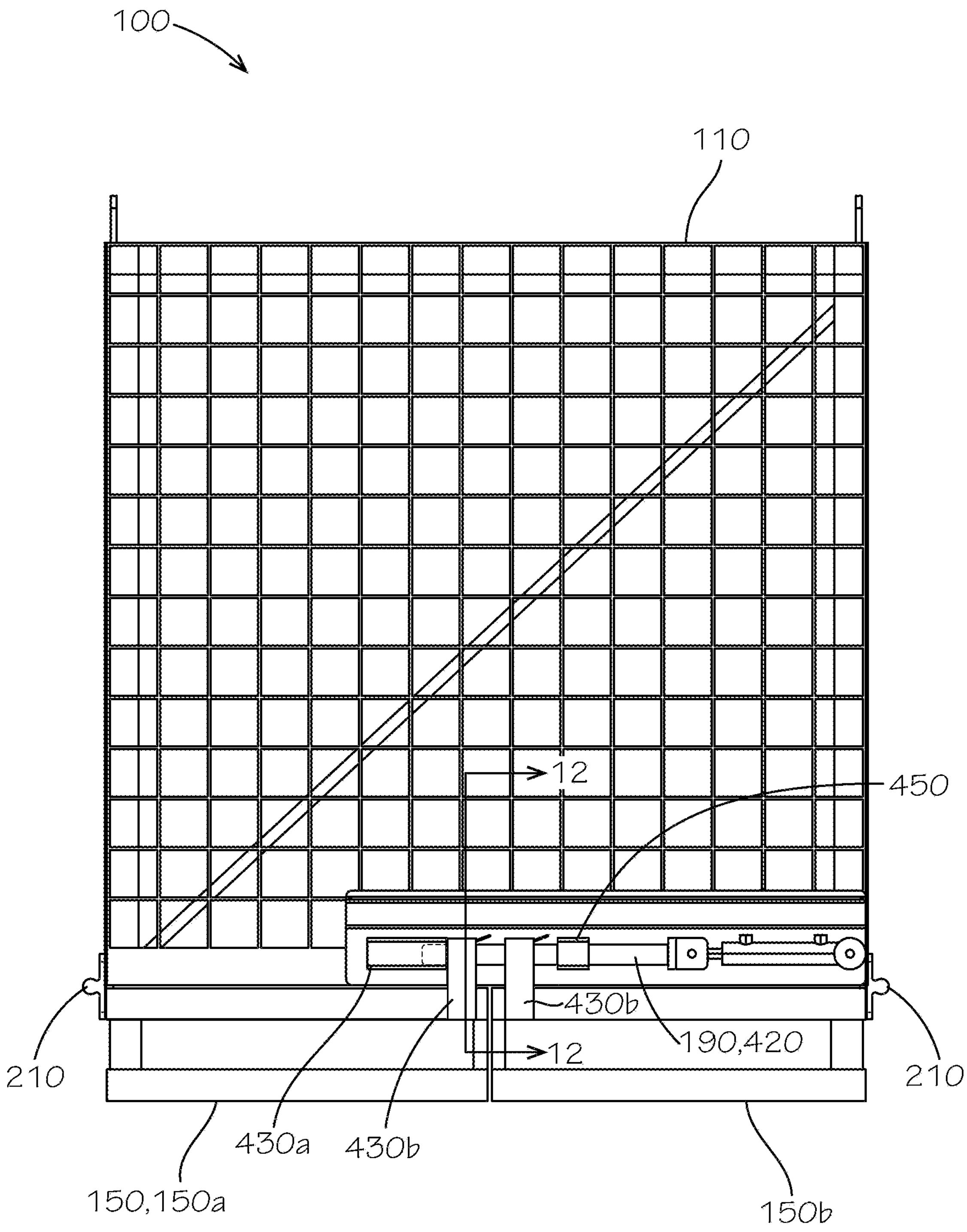
FIG. 11 is a front view of the collection device of FIG. 1 comprising the latch of FIG. 10 engaging two halves of a base in accordance with yet another aspect of the current disclosure.
Figure 12:
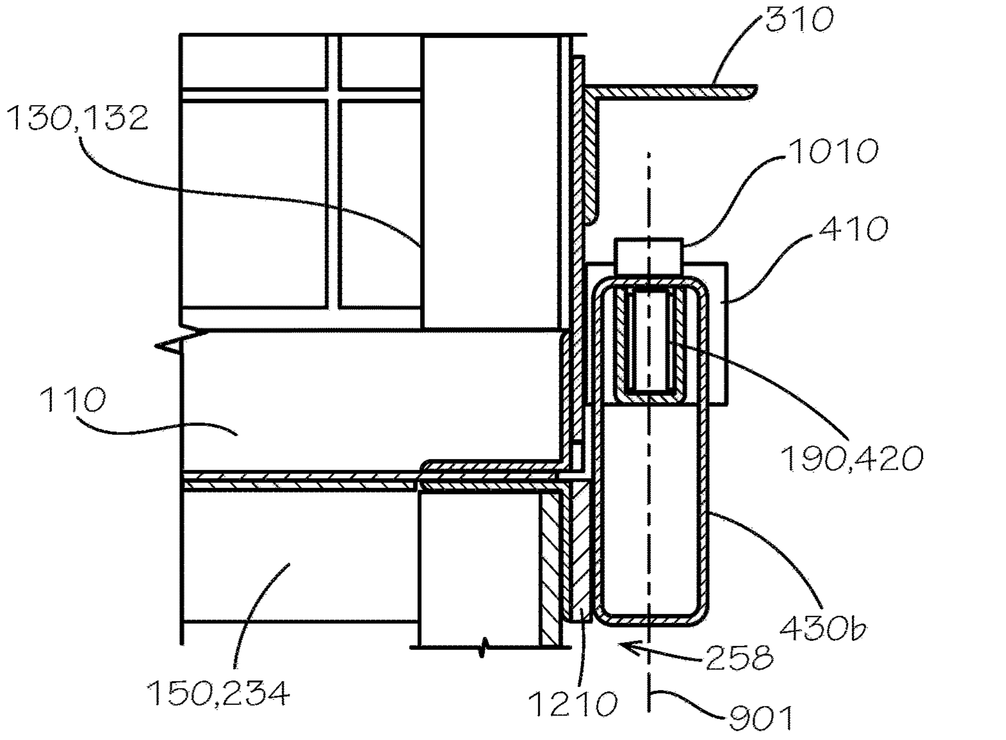
FIG. 12 is a detail sectional view of the collection device of FIG. 10 taken along line 12-12 of FIG. 10 and the collection device of FIG. 11 taken along line 12-12 of FIG. 11.

FIGS. 10-12 show the latch 190 of the collection device 100 in accordance with another aspect of the current disclosure. More specifically, in some aspects, the strikes 430*a,b* can be sized, positioned, and otherwise configured to receive the bolt 420 defining a single prong. FIG. 10 is a front view of the collection device 100 and more specifically the latch 190 showing the strikes 430*a,b* in such a configuration. More specifically, the lower strike 430*b* can been resized to extend upward beyond the top end 155 of the base 150 far enough to catch or receive the bolt 420. As shown, the strike 430*b* can comprise an entrance guide 1010 to facilitate entry of the bolt 420 through the strike 430*b* during travel and engagement of the bolt 420. The entrance guide 1010 can be a flange or panel and can be bent with respect to a mating portion of a strike such as, for example and without limitation, the strike 430*b*. As shown, the latch 190 or a portion thereof such as the bolt 420 can extend through one or more of the strikes 430*a,b* in a closed position of the latch 190. More specifically, as shown, the bolt 420 can extend in a horizontal direction.

In other aspects, as shown in FIG. 11, also a front view of the collection device 100 and more specifically the latch 190, two lower strikes 430*b* can be sized, positioned, secured to and otherwise configured on each of two halves or portions 150*a,b* of the base 150 to receive the bolt 420 defining a single prong. As shown, the hinges 210 can secure the base halves 150*a,b* to opposite sides of the enclosure 110.

FIG. 12 is a detail sectional view of the collection device 100 shown in each of FIGS. 10 of FIG. 10 taken along line 12-12 of FIG. 10 and the collection device 100 of FIG. 11 taken along line 12-12 of FIG. 11. In some aspects, a spacer 1210 may be positioned between the strike 430*b* and the base 150 to align an interior cavity of the strike 430*b* with the bolt 420 or to position an interior cavity of the strike 430*b* to otherwise receive the bolt 420 of the latch 190. In other aspects, no such spacer is required and the strike 430*b* can be otherwise configured to receive the bolt 420.

In other aspects not shown, an orientation of the latch 190 and cylinder 180 can be angled and positioned different from the orientation and position shown. For example and without limitation, the cylinder 180 (shown in FIG. 1) can be oriented vertically on each of one or more sides of the enclosure 110, and the latch 190 can be made to translate or rotate—or translate and rotate—from a disengaged position into engagement with a strike such as one of the strikes 430*a,b*, which has likewise been configured together with the bolt 420 so that the bolt 420 and the strike engage each other. For example, one of the bolt 420 and the strike 430 can define a hook and the other can define a catch. In some aspects, as shown, moving the rod 486 of the actuator 180 in a "positive" direction, i.e., away from a body of the actuator 180, will lock the latch 190. In some aspects, moving the rod 486 of the actuator 180 in a "negative" direction, i.e., towards the body of the actuator 180, will lock the latch 190, such as when rotation of the bolt 420 of the latch 190 about a pivot is involved and such rotation moves the bolt 420 closer to engagement with the base 150. Engagement of the latch 190 with the strike 430*b* of the base 150 and, in some aspects, also the strike 430*a* of the enclosure 110 can fix a relative position of the base 150 with respect to the enclosure 110.

In some aspects, including those described above or below, the latch 190 can engage the base 150 without the separate strikes 430*a,b*. For example and without limitation, the latch 190 can directly engage the horizontal members 234 through the side openings 258, if present, or simply around the base barrier 170 sufficiently so as to maintain the position of the base 150 against the enclosure 110. In some aspects, as described above, the base 150 can be released entirely from the enclosure 110 when releasing the contents of the collection device and can be later recovered or simply disposed of with the materials disposed of. In some aspects, the base 150 can comprise a pallet or other disposable frame.

Figure 13:
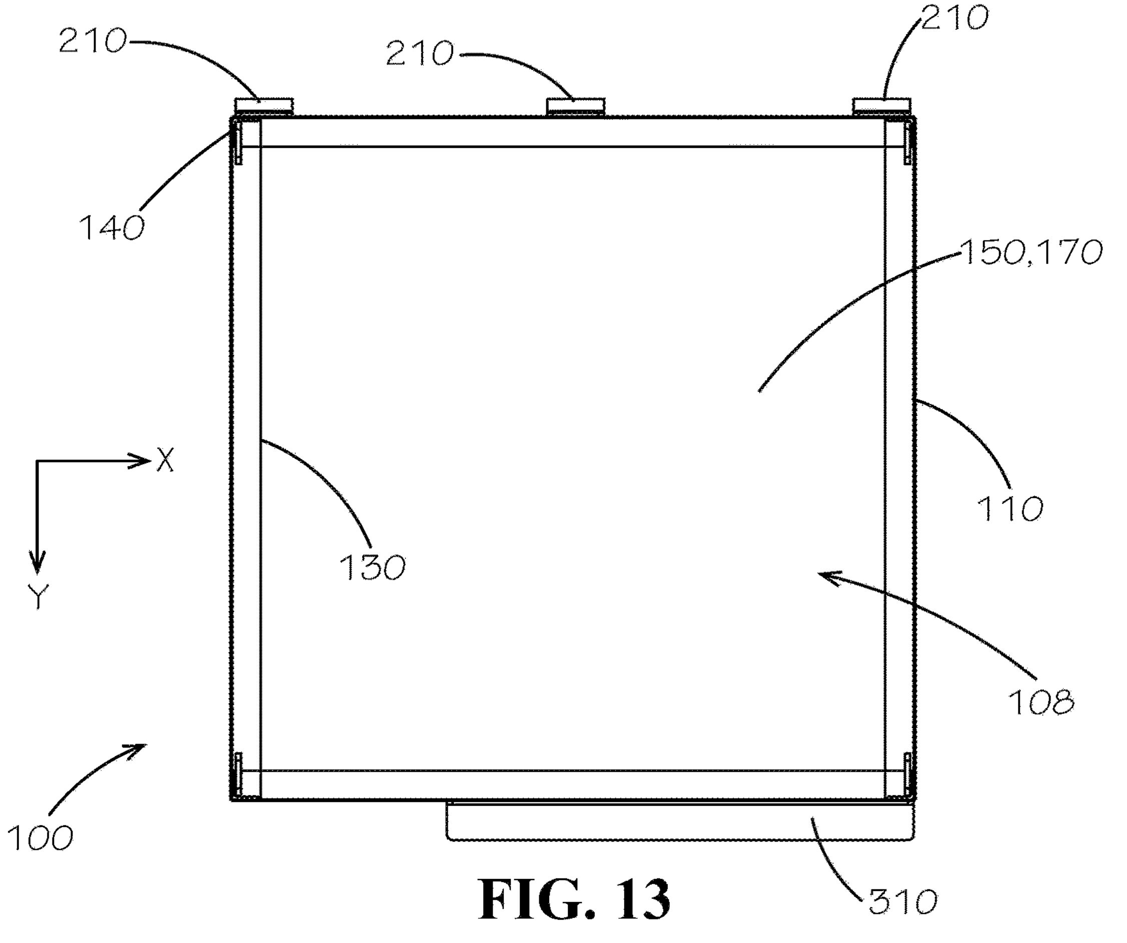
FIG. 13 is a top view of the collection device of FIG. 1.

FIG. 13 is a top view of the collection device 100 showing various structures described above including the enclosure 110 and the base 150 comprising the base barrier 170. As shown, the base barrier 170 can be configured to prevent passage of material deposited inside the enclosure 110 through a bottom opening 118 of the enclosure 110.

In some aspects, as shown, the enclosure 110 and the enclosure cavity 108 defined thereby can define a shape of a cube or a rectangular prism or at least edges and/or corners thereof. In other aspects, the enclosure 110 can define in cross-section in the X-Y plane any other closed round or polygonal shape such as, for example and without limitation, the shape of a cylinder.

In some aspects, any portion or all of the enclosure 110—including, for example and without limitation, any of the members 132, 134, 136 (shown in FIG. 1) of the frame 130, the lifting lugs 140, and the enclosure barrier—and any portion or all of the base 150 can be formed from a metal such as steel or aluminum. In some aspects, any portion or all of the enclosure 110 and any portion or all of the base 150 can be formed from a sufficiently strong non-metallic material such as, for example and without limitation, a composite material or a polymer material, either of which can be reinforced with carbon or glass fibers, and/or even a biodegradable material such as, for example and without limitation, cardboard or plastic with a corrugated core, a honeycomb core, or another form of reinforcement.

The components of the collection device 100 and any disclosed surround structure can be formed from any one or more of a variety of manufacturing processes. For example and without limitation, the bolt 420 can be fabricated using subtractive manufacturing processes such as machining, forging, and stamping and/or using additive manufacturing processes such as three-dimensional printing.

Figure 14:
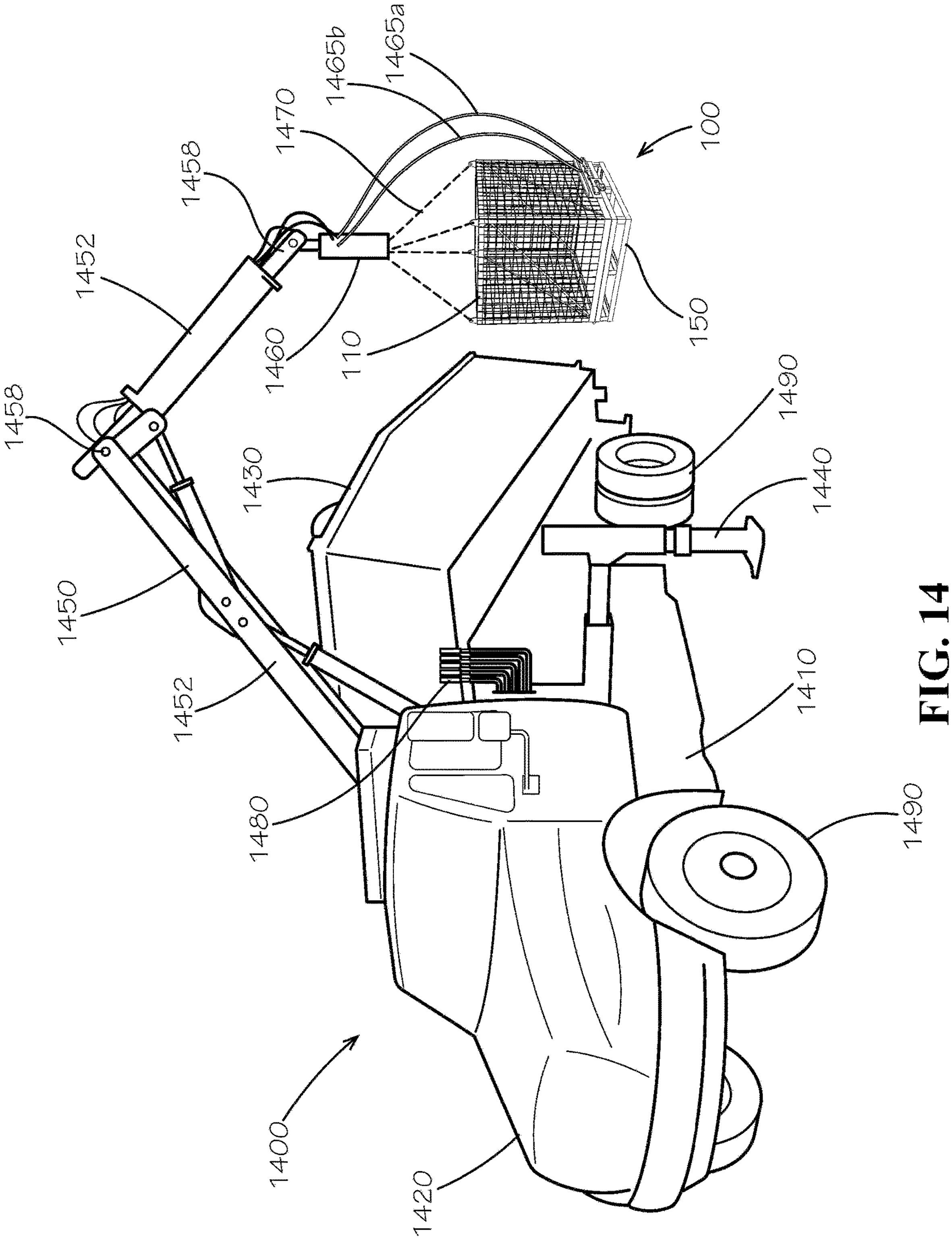
FIG. 14 is a perspective view of a vehicle comprising the collection device of FIG. 1 showing a base of the collection device in a closed or engaged position.
Figure 15:
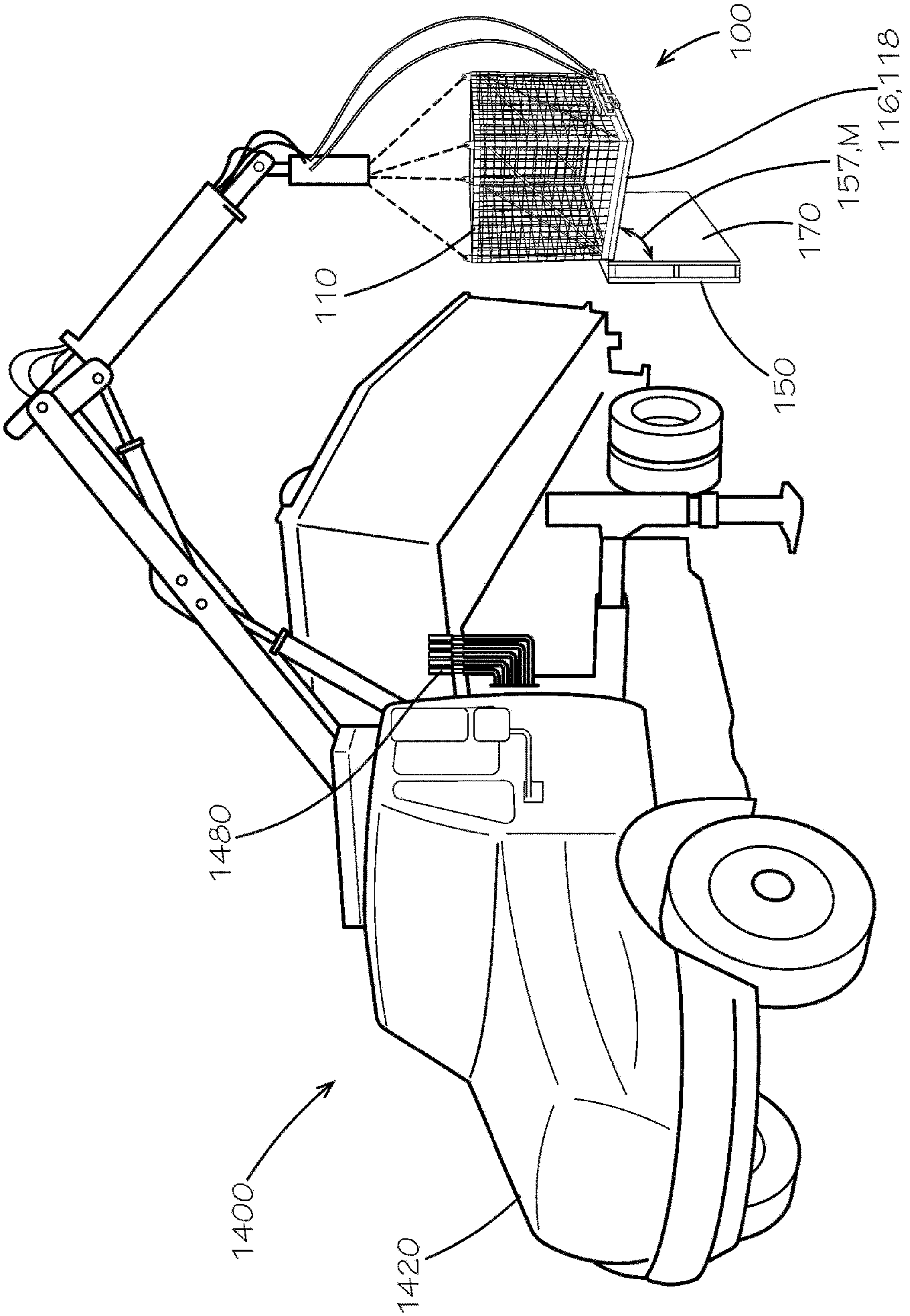
FIG. 15 is a perspective view of the vehicle of FIG. 14 showing the base of the collection device in an open or released position.

In some aspects, as shown in FIGS. 14 and 15, a vehicle 1400 can be used to place, empty, and otherwise handle the collection device 100. The vehicle 1400 can, for example and without limitation, comprise a chassis 1410, a cargo container or receptacle 1430 coupled to the chassis 1410, a controller 1480, and wheels 1490. As shown, the vehicle 1400 can comprise the collection device 100 itself. In some aspects, the vehicle 1400 can be any vehicle or even a stationary but optionally portable machine able to be configured to lift the collection device 100 with either the controller 1480 separate from or incorporated into the vehicle 1400. In some aspects, the receptacle 1430 can be part of the vehicle 1400 but the lifting and manipulating of the collection device 100 can be performed by any conventional lifting machine or device.

FIG. 14 is a perspective view of a vehicle 1400 comprising the collection device 100 and showing the base 150 of the collection device 100 in a closed or engaged position. The vehicle 1400 can comprise the chassis 1410 on or to which a cab 1420 can be secured and onto which the receptacle 1430, one or more stabilizers 1440, and a boom 1450 can be movably and adjustably secured. The collection device 100 can be suspended from a coupling 1460, which can be secured to a distal end of the boom 1450. The collection device 100 and specifically the enclosure 110 can be secured to the coupling with lifting lines 1470. Each of the lifting lines 1470 can be a chain or any other sufficiently strong connection such as, for example and without limitation, a rigid or flexible rod, a rope, a strap, or a cable. Hydraulic or pneumatic feed lines 1465*a,b* can be connected to and in fluid communication with the inputs 482*a,b* (shown in FIG. 4) of the cylinder 180 (shown in FIG. 4). In some aspects, the controller 1480, which can be in electrical and/or fluid communication with the feed lines 1465*a,b*, can from a position outside the cab 1420 operate the cylinder 180. In other aspects, the controller 1480 or the feed lines 1465*a,b* can be operated inside the cab 1420. As shown, the controller 1480 can comprise levers that are able to move the boom 1450, and thereby also the collection device 100, as desired.

The boom 1450, which can extend between the chassis 1410 and the collection device 100, can comprise one or more articulated members 1452 and one or more joints 1458, which can together allow the boom 1450 to reach the collection device 100 at some distance away from the vehicle 1400, lift and manipulate the collection device 100 up and over the receptacle 1430, and release the bottom or base 150 of the collection device 100 to release the contents thereof into the receptacle 1430. The release of the base 150 from the enclosure 110 can be by manipulation of the controller 1480.

FIG. 15 is a perspective view of the vehicle 1400 showing the base 150 of the collection device 100 in an open or released position.

A method of using the collection device 100 and a collection system comprising the collection device 100 can comprise depositing material into the collection device 100 by a user of the device. The method can comprise using the vehicle 1400 to lift the collection device 100 at a first position of the collection device 100 and dump the material from the collection device 100 at a second position of the collection device 100. The method can comprise lifting the collection device 100 and can comprise, more specifically, lifting the collection device 100 to a position over the receptacle 1430. The method can comprise activating an actuator 180 of the collection device 100 by a controller 1480 positioned remotely from the collection device 100 to disengage the latch 190 of the collection device 100 from the base 150. In some aspects, communication between the controller 1480 and the collection device 100 or, more specifically, the actuator 180, can be wireless and can be initiated by, monitored by, or otherwise accessible through a portable electronic device such as, for example and without limitation, a tablet or smart phone. More specifically, activating the actuator 180 can comprise extending a piston of a cylinder. In some aspects, the piston can travel in a direction parallel to an orientation of the base 150. In some aspects, the piston can travel in a direction angled with respect to an orientation of the base 150.

The method can comprise releasing the base 150 of the collection device 100 from at least a portion of the enclosure 110 to allow the material deposited into the collection device 100 to exit a bottom opening 118 defined by the collection device 100. In some aspects, as shown, the base 150 of the collection device 100 can remain continually attached to the enclosure 110 of the collection device 100 after partially releasing the base 150. In some aspects, the base 150 of the collection device 100 can become fully detached from the enclosure 110 after being released. Accordingly, the method can comprise detaching the base 150 from the enclosure 110. The method can comprise closing the bottom opening 118 by pushing the base 150 back into a closed position against the enclosure 110, including by simply lowering the collection device 100 vertically downward against a surface that is sufficiently horizontal. The method can comprise activating the actuator 180 of the collection device 100 by the controller 1480 to re-engage the latch 190 of the collection device 100 with the base 150. In some aspects, disengaging and engaging the latch 190 can require the same hydraulic or other force employed by the actuator 180. In some aspects, the latch 190 can require greater force during disengagement, including when the collection device 100 is loaded with materials.

In some aspects, one or more of the collection devices 100 comprising both the enclosure 110 and the base 150 can be deposited in a single collection location or distributed in multiple collection locations for filling by a user and later pickup by the vehicle 1400, which need not be equipped with a separate collection device 100. Accordingly, the method of using the collection device 100 can comprise depositing one or more of the collection devices 100 in any one or more locations for filling by a user and later pickup, e.g., by the vehicle 1400. After being located on-site at a particular collection location and being used to collect materials, the collection device 100 can simply be connected to the vehicle 1400 for lifting and dumping of the contents into the receptacle 1430. Accordingly, the method can comprise connecting the collection device 100 to the vehicle for lifting and dumping of the contents into a receptacle such as the receptacle 1430. In some aspects, one or more of the collection devices 100 comprising only the base 150—not necessarily comprising the actuator 180, latch 190, and other valuable components nor necessarily exposing such components to an outside environment such as that comprising rain, mud, and/or equipment on the ground able to impact operation of the latch 190—can be deposited in a single location or in multiple locations for filling by the user and later pickup by the vehicle 1400. The enclosure 110 can remain attached to the vehicle 1400 for connection, lifting, and dumping of the collections device 100 one by one or as desired. In some aspects, an auxiliary enclosure barrier such as a fence or box formed from cardboard, plastic, or another material can be positioned on top of and be secured to the base 150 to help capture and retain materials thrown inside, and the enclosure 110 can fit over the base 150—and, where present, over the auxiliary enclosure barrier—during the process of retrieving, lifting, and dumping the contents of the collection device 100. In some aspects, the method can comprise disposing of the base 150 of the collection device 100 together with the contents of the collection device 100, in which case "disposing" can mean any disposition of the base 150 that involves separation of the base 150 from the enclosure 110, even if the base 150 is re-used, or "disposing" can mean disposing the base 150 in the trash.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A collection device comprising:

an enclosure defining a top opening and a bottom opening;

a latch coupled to the enclosure and configured to selectively secure a base to the enclosure proximate to the bottom opening; and an actuator coupled to the latch, the actuator controlled remotely and configured to open the latch and thereby release the base, the actuator being a hydraulic cylinder.

2. The device of claim 1, wherein the enclosure comprises a frame configured to prevent racking of the enclosure.

3. The device of claim 1, wherein the enclosure defines a lifting opening configured to be used to lift the collection device.

4. The device of claim 1, further comprising the base, the base coupled to a first portion of the enclosure, the latch selectively securing the base to a second portion of the enclosure, the second portion being distal from the first portion, the base being releasable from the enclosure by disengagement of the latch.

5. The device of claim 4, wherein the base comprises a base barrier extending across a top end of the base and configured to prevent passage of material deposited inside the enclosure through a bottom opening of the enclosure.

6. The device of claim 4, wherein the base comprises a frame configured to prevent racking of the base.

7. The device of claim 6, wherein the base defines a side opening, the side opening defined more specifically by a horizontal member extending across the base proximate to at least one of a top end and a bottom end of the base.

8. The device of claim 4, wherein the base is coupled to the enclosure with a hinge, the base rotatable with respect to the enclosure about an axis of the hinge.

9. The device of claim 4, wherein the latch comprises a bolt comprising at least one prong, the bolt configured to engage a portion of the base.

10. The device of claim 9, wherein the base comprises a strike configured to receive the latch, engagement of the latch with the strike fixing a relative position of the base with respect to the enclosure.

11. The device of claim 9, wherein the enclosure comprises a strike configured to receive the latch, engagement of the latch with the strike of the base and the strike of the enclosure fixing a relative position of the base with respect to the enclosure.

12. The device of claim 9, wherein a strike of the collection device comprises an entrance guide configured to guide the bolt into an opening defined by the strike.

13. A vehicle comprising:

a chassis;

a receptacle coupled to the chassis;

a collection device coupled to one of the chassis and the receptacle, the collection device comprising:

an enclosure;

a base coupled to a first portion of the enclosure;

a latch selectively securing the base to a second portion of the enclosure; and an actuator coupled to the latch; the actuator configured to operate the latch and thereby selectively release and secure the base; and a controller coupled to one of the chassis, the receptacle, and the collection device, the controller configured to control the actuator.

14. The vehicle of claim 13, further comprising a boom coupled to the chassis, extending between the chassis and the collection device, and supporting the collection device; the boom configured to manipulate a position of the collection device.

15. The vehicle of claim 13, wherein the controller is positioned remotely with respect to the collection device, the controller being in communication with a feed line connected to the actuator of the collection device.

16. A method of using a collection system, the method comprising:

lifting a collection device of the system, an enclosure of the collection device of the system enclosing a material deposited therein by a user of the collection system;

activating an actuator of the collection device with a controller to disengage a latch of the collection device from a base of the collection device, the actuator being a hydraulic cylinder; and releasing the base of the collection device from at least a portion of the enclosure to allow the material to exit a bottom opening defined by the collection device.

17. The method of claim 16, wherein the base of the collection device remains attached to the enclosure of the collection device after releasing the base.

18. The method of claim 16, further comprising:

closing the bottom opening by pushing the base back into a closed position against the enclosure; and activating the actuator of the collection device by the controller to engage the latch of the collection device with the base.

19. The method of claim 16, further comprising using a vehicle to lift the collection device at a first position of the collection device and dump the material at a second position of the collection device.

20. A collection device comprising:

an enclosure defining a top opening and a bottom opening;

a base coupled to a first portion of the enclosure, the base comprising a base barrier extending across a top end of the base and configured to prevent passage of material deposited inside the enclosure through the bottom opening of the enclosure;

a latch coupled to the enclosure and configured to selectively secure the base to the enclosure proximate to the bottom opening, the latch selectively securing the base to a second portion of the enclosure, the second portion being distal from the first portion, the base being releasable from the enclosure by disengagement of the latch; and an actuator coupled to the latch, the actuator controlled remotely and configured to open the latch and thereby release the base.

21. A collection device comprising:

an enclosure defining a top opening and a bottom opening;

a base coupled to a first portion of the enclosure, the base comprising a frame configured to prevent racking of the base, the base defining a side opening, the side opening defined more specifically by a horizontal member extending across the base proximate to at least one of a top end and a bottom end of the base;

a latch coupled to the enclosure and configured to selectively secure the base to the enclosure proximate to the bottom opening, the latch selectively securing the base to a second portion of the enclosure, the second portion being distal from the first portion, the base being releasable from the enclosure by disengagement of the latch; and an actuator coupled to the latch, the actuator controlled remotely and configured to open the latch and thereby release the base.

22. A collection device comprising:

an enclosure defining a top opening and a bottom opening;

a base coupled to a first portion of the enclosure;

a latch coupled to the enclosure and configured to selectively secure the base to the enclosure proximate to the bottom opening, the latch selectively securing the base to a second portion of the enclosure, the second portion being distal from the first portion, the base being releasable from the enclosure by disengagement of the latch, the latch comprising a bolt comprising at least one prong, one of the enclosure and the base comprising a strike configured to receive the latch, the bolt configured to engage the strike, the strike being configured to receive the bolt; and an actuator coupled to the latch, the actuator controlled remotely and configured to open the latch and thereby release the base.

23. The device of claim 22, wherein the base comprises the strike, engagement of the latch with the strike fixing a relative position of the base with respect to the enclosure.

24. The device of claim 22, wherein the enclosure comprises the strike, engagement of the latch with the strike fixing a relative position of the base with respect to the enclosure.

25. The device of claim 22, wherein the enclosure comprises the strike, the strike being a first strike, the base comprising a second strike, engagement of the latch with each of the first strike and the second strike securing the base to the enclosure.

26. The device of claim 22, wherein the strike comprises an entrance guide configured to guide the bolt into an opening defined by the strike.

* * * * *